US012379996B2

(12) United States Patent
Fröhlich et al.

(10) Patent No.: US 12,379,996 B2
(45) Date of Patent: Aug. 5, 2025

(54) SELF-DISTRIBUTED MULTIMODAL DRIFT DETECTION AT THE EDGE

(71) Applicant: Dell Products L.P., Round Rock, TX (US)

(72) Inventors: Herberth Birck Fröhlich, Florianópolis (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 18/475,132

(22) Filed: Sep. 26, 2023

(65) Prior Publication Data

US 2025/0103435 A1     Mar. 27, 2025

(51) Int. Cl.
*G06F 11/07*       (2006.01)
*G06F 11/14*       (2006.01)

(52) U.S. Cl.
CPC .................................. *G06F 11/14* (2013.01)

(58) Field of Classification Search
CPC ... G06F 11/14; G06F 11/1476; G06F 11/2263
USPC ................................................ 714/1, 26, 37
See application file for complete search history.

(56) References Cited

U.S. PATENT DOCUMENTS

2021/0365475 A1* 11/2021 Shreedharan ......... G06F 16/213
2023/0048306 A1* 2/2023 Roque .................. G06F 9/5072

FOREIGN PATENT DOCUMENTS

DE         102020202865 B3 *  8/2021  ........... G05B 23/024

OTHER PUBLICATIONS

Bayram et al. From concept drift to model degradation: An overview on performance-aware drift detectors, Knowledge-based systems, vol. 245, 2022.
Gagama et al. "Integrated Edge Management in Smart Manufacturing: A model-based approach for edge computing," Dell Technologies, 2022.
U.S. Appl. No. 17/937,204, filed Sep. 30, 2022, titled "Drift Mode Acquisition Using Successive Model Training".

* cited by examiner

*Primary Examiner* — Chae M Ko
(74) *Attorney, Agent, or Firm* — Workman Nydegger

(57) ABSTRACT

One example method includes performing operations, in a computing environment that includes multiple layers, one of which is a functional edge layer, that include obtaining input parameters, and one of the input parameters identifies one of the layers of the computing environment where a machine learning model is located, based on the input parameters, placing a control module in one of the layers of the computing environment, determining, by the control module, candidate layers of the computing environment for respective instances of a drift module, and placing a respective one of the instances of the drift module in each of the candidate layers, running the control module to identify an instance of the drift module to be activated, and activating the identified instance of the drift module, and detecting, by the activated instance of the drift module, drift in the machine learning model.

20 Claims, 5 Drawing Sheets

SELF-DISTRIBUTED MULTIMODAL DRIFT DETECTION AT THE EDGE

FIELD OF THE INVENTION

Embodiments of the present invention generally relate to the use of ML (machine learning) models in an edge computing environment. More particularly, at least some embodiments of the invention relate to systems, hardware, software, computer-readable media, and methods, for drift detection in edge deployed ML models.

BACKGROUND

Due to various considerations, the outputs generated by an ML model may drift over time. That is, the inferences generated by the ML model may move away from established parameters. For example, the output error of an ML model may deviate from an accepted standard, such as to due to degradation or changes to the operating domain of the ML model, so that the ML model is no longer providing useful inferences. As such, attention has been directed to attempts to detect drift in an ML model so as to enable changes to the ML model to reduce or eliminate the drift. However, drift detection can be problematic in environments, such as multi-layer edge computing environments, where there can be complex relationships between and among processing power, storage requirements and detection of different drift modes detection.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
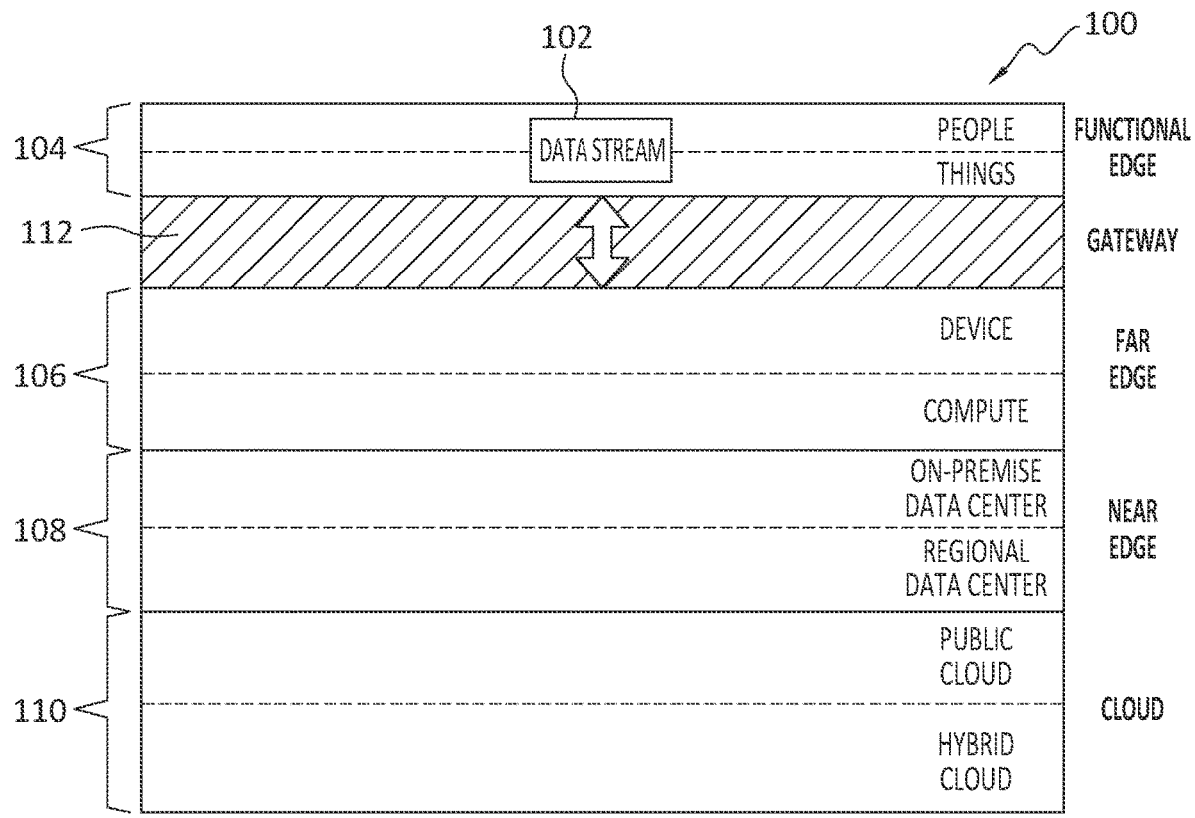
FIG. 1 discloses aspects of an example architecture according to one example embodiment.

Embodiments of the present invention generally relate to the use of ML (machine learning) models in an edge computing environment. More particularly, at least some embodiments of the invention relate to systems, hardware, software, computer-readable media, and methods, for drift detection in edge deployed ML models.

In general, an embodiment of the invention may utilize data from a computing environment, such as a functional edge. While the data may be primarily used to feed an ML model that provides real-time, or near real-time, inferences concerning the data, the data may be used as a basis for performing a data-driven workload placement for drift detection for the ML model. An embodiment comprises an approach to deal with domain-based constraints defining how quickly drift should be detected, and exploiting latency information across the multiple edge environment layers to determine a current best place for drift mode building, that is, for placement of one or more instances of drift mode building and drift mode detection models.

That is, in edge environments, which may comprise a functional edge, far edge, near edge and cloud, an embodiment of the invention considers the differences in processing capabilities, latency, and storage, available at/between each layer. An embodiment of the invention may leverage the respective capabilities of each layer in a cascading fashion, to automatically place each drift detection stage, each of which may take the form of a drift mode building module, at the most suitable layer, so that layer resources such as bandwidth and storage are optimally used, and preserved. In an embodiment, computing and storage are pushed up towards a cloud environment, while still meeting latency requirements for the drift detection and drift mode building tasks. That is, an embodiment may comprise a mechanism, and orchestration process, for automatically placing the drift mode building modules at the optimal layer, in cascading fashion, in an edge environment, considering latency, bandwidth, and storage concerns.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that drift mode detection may be performed in a way that accounts for limitations on layer resources, while also taking latency considerations for drift detection and drift mode building tasks into account. An embodiment may implement placement of drift detection and mode building modules at optimal layers in a multi-layer edge environment. Various other advantages of one or more embodiments will be apparent from this disclosure.

A. Context for an Embodiment of the Invention

The following is a discussion of aspects of contexts for one or more embodiments of the invention. This discussion is not intended to limit the scope of the invention, or the applicability of the embodiments, in any way.

A.1 Edge Environment

An embodiment of the invention may be implemented in an edge environment architecture, the formulation and terminology of an example of which are disclosed in "F. Bayram, S. Ahmed e A. B Kassler, '*From concept drift to model degradation: An overview on performance-aware drift detectors,*' Knowledge-based systems, vol. 245, 2022" ("Bayram"), which is incorporated herein in its entirety by this reference. One example architecture is referenced at 100 in FIG. 1. As shown there, a datastream 102 inputs the domain data into the system, at the functional edge layer 104. The far edge layer 106, near edge layer 108, and cloud layer 110 may be considered to be layered 'on top' of the functional edge layer 104, and linked to the functional edge layer by a gateway infrastructure 112. Note that the example architecture 100 is agnostic to the types, and number, of layers, and assumes the availability of information about latency, and storage resources in, the various layers.

Within an architecture, such as the architecture 100 for example, the concepts of Data Intensity and Time to Data Insight, as disclosed in "M. Gaganam, D. Cummins, A. Oliveira da Silva e W. Biester, '*Integrated Edge Management in Smart Manufacturing: A model-based approach for edge computing,*' DELL Technologies, 2022" ("Gaganam") (incorporated herein in its entirety by this reference, may be employed in connection with an embodiment of the invention. In general, 'data intensity' relates the quantity of data being produced over a period of time, in terms of volume and/or velocity. Further, 'time to data insight' (TDI) may be either [1] the amount of time that elapses between the generation of data in an edge environment to the interpretation of that data, including any latency that must be considered, or [2] the time when drift in the ML model is detected. As used herein a data 'insight' refers to the detection of an event, embodied in the datastream 102, by the ML model. The 'interpretation' of the data refers to the time when the output of an ML model becomes available for consumption, that is, use, by a control module, an example of which is discussed below in connection with FIG. 2.

In an embodiment, both data intensity and TDI may be considered in the task of drift detection, that is, the task of determining if, and when, a deployed ML model, also referred to herein simply as a 'model,' is not performing to its expected accuracy due to, for example, degradation or changes to the domain.

Note that while one example embodiment may adopt the definitions of the layers disclosed in FIG. 1, the invention is, more generally, agnostic as to both the to the meaning and number of layers considered in any particular embodiment. As such, the architecture 100, and its components, are presented by way of example, and are not intended to limit the scope of the invention in any way.

A.2 Performance-Based Detection, and Distribution-Based Drift Detection

In an embodiment, drift refers to a deterioration in performance measured in the in-use metric of a data-driven method over time, either because the input distribution, that is, the input data distribution, to the ML model has changed, or because the mapping between the input data to the ML model and the ML model output has changed. This drop in performance is silent because it can be interpreted as a normal low performance level. Failing to timely address this problem can lead to wrong decisions about the output of the ML model, jeopardizing an entire chain of events.

Since any data distribution input to an ML model, including the datastream 102, is susceptible to changes, drift detection methods may tend to focus on monitoring inputs and outputs of ML models. However, such approaches may be only partly effective. Thus, a combination of approaches may be employed for drift detection, namely, performance-based approaches that may trace deviations in the output error of the ML model. These approaches may only handle the change when the performance is affected. Another approach that may be used in a combination may comprise distribution-based approaches that may use distance measures to estimate the similarity between the input data distributions respectively associated with two different time-windows.

A.3 Drift Mode Building

The progress of a drift event can be indirectly detected. The literature presents multiple drift modes, which describe the evolution of a drift event. By discovering the particular drift mode that is ongoing, it is possible to define the best strategy, that is, the drift detection method, to be applied during operation.

One example embodiment of the invention may consider four different modes of drift disclosed in Bayram, namely, sudden, gradual, incremental, and recurring. These are each considered in turn below.

In 'sudden drift,' the target distribution changes abruptly at a point in time. Relatively, only a small window of data may be required to detect this drift. The performance drop may be quickly identified if the new concept is not within the operational module generalization capabilities. A single incidence may be enough to confirm this drift mode.

In 'gradual drift,' the target distribution changes progressively from one concept to another. It takes longer to detect the model deterioration as gradual drift because the performance loss happens in slowing and progressive intervals until complete drift is established.

'Recurring drift' occurs when a previously-seen concept reappears again after a similar time interval, for a similar duration. Two recurrences may be enough to confirm this drift mode.

Finally, 'incremental drift' occurs when a new concept replaces the old one slowly, and in a continuous manner, without the intermittent occurrence of the model normal operation.

In an embodiment, the task of drift mode building, that is, building a model capable of detecting drift, considers drift frequency and the interval to build a model capable of identifying the mode, as soon as possible, that is, with the minimum amount of samples. Each drift mode may require a certain number of observations to be confirmed. The sudden drift mode, for example, while characterized by an abrupt change, may be able to be detected with a small window of observations, while reoccurring drift progression, on the other hand, may demand many application cycles before that drift mode can be confirmed.

There are supervised and non-supervised approaches for drift mode building. For all of them a threshold should be established to define whether or not a particular performance deterioration is significant. Any methods or approaches for drift mode detection may be used in one or more embodiments of the invention. The U.S. patent application Ser. No. 17/937,204, filed Sep. 30, 2022, titled "DRIFT MODE ACQUISITION USING SUCCESSIVE MODEL TRAINING," ("Drift Mode Detection") incorporated herein in its entirety by this reference, discloses example methods to detect sudden and gradual drift modes, but other approaches may apply.

It is noted that is typically the case that the drift mode building requires the drift to first be detected. One embodiment of the invention, however, may merge the drift detection task and the drift mode building task in a single common module, which may be referred to herein simply as a 'drift module,' respective instances of which may be deployed in various layers of an architecture. One point to be considered is the time interval dependency, which may be expressed in terms of storage requirements. A larger amount of storage may be required for recurring and incremental drift modes, for example.

B. Detailed Discussion of Aspects of an Example Embodiment

Figure 2:
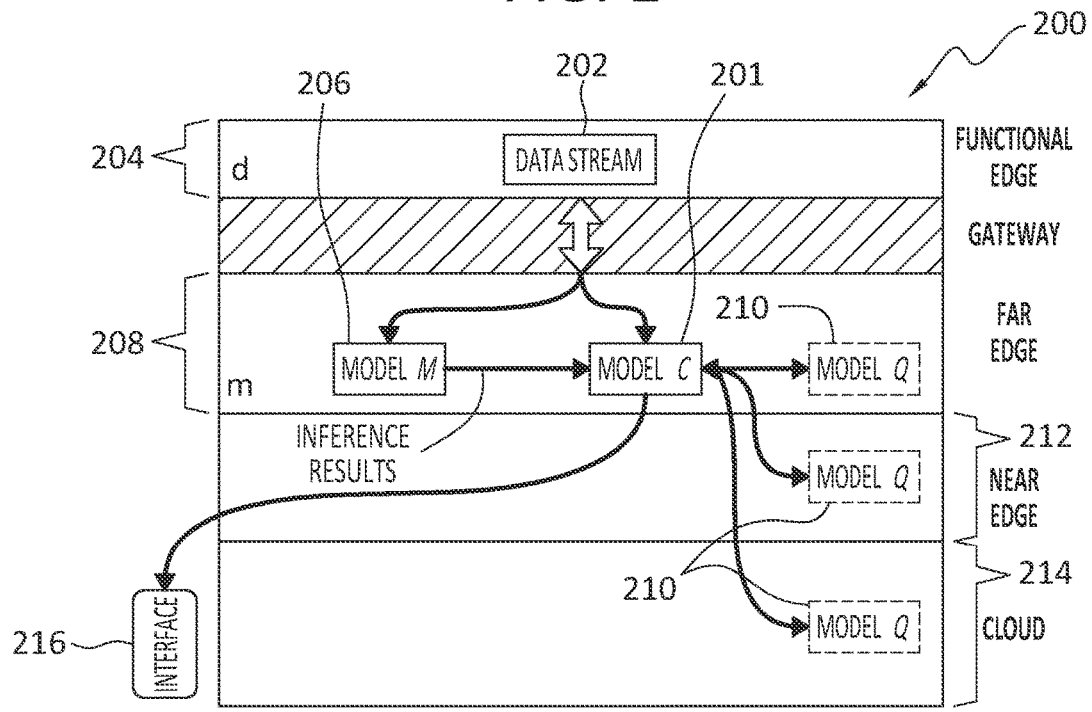
FIG. 2 discloses aspects of the placement of a control module, ML model, and drift model instances, according to one example embodiment of the invention.

Turning next to FIG. 2, an example architecture 200 in FIG. 2 may be similar or identical to the architecture 100. FIG. 2 particularly discloses an example of a setting in which a control module C 201 is placed at a far edge layer, as discussed in more detail below. An example embodiment of the invention may assume the existence of a datastream [D] 202 at a functional edge layer 204, where the functional edge layer may be referred to herein as layer [d]. Datastreams may be generated at any of the other layers disclosed in FIGS. 1 and 2, but one particular embodiment is concerned with domain data generated at the functional edge layer 204, which typically impose the tightest requirements in decision making and actionable insights, including the inference through an ML model and the drift detection of that ML model. An embodiment of the invention may further consider that an operational ML model [M] 206 located at layer [m] 208 receives the datastream 202 as input and provides an inference result, which may then be used for decision making, orchestration and actions, depending on the domain.

As noted above, FIG. 2 discloses one possible placement of the control module C 201 deployed at layer [m] 208 or above where, for reference, the layer [m] 208 is considered to be higher than, or 'above,' layer [d] 204 for example. In this scheme, and the architecture 200, the functional edge layer 204 is the lowermost layer. Note that lower layers, such as the functional edge layer 204, may be resource-constrained, relative to higher layers, such as the far edge layer 208. As such, the lower layers may have correspondingly have limited functionality and capability relative to that of higher layers.

In an embodiment, the control module C 201 may monitor the hops, or communication paths, within the architecture 200, store the TDI metrics, and orchestrate the placement of the drift detection and mode building module(s), namely, the one or more instances of module Q 210. An instance of a drift detection and mode building module may be referred to herein simply as 'module Q' or a 'drift module Q.'

In an embodiment, each instance of the module Q 210 may be independently activated, or deactivated, by the control module C 201, such as according to latency and storage demands. Starting at layer [c] 208, so referred to because the control module C 201 may be deployed there, a copy or instance of module Q 210 may be placed at each layer above layer [c] 208. Note that, in an embodiment, layer 208 is also referred to as layer [m] since the ML model [M] 206 is deployed there. In an embodiment, a respective copy or instance of module Q 210 may be placed at the far edge layer 208, near edge layer 212, and a cloud layer 214. As discussed above, an embodiment of the invention may assume drift mode detection approaches such as the one set forth in the Drift Mode Detection document, but other similar and/or alternative approaches can and should be embedded within module Q 210 to make the solution thorough by detecting all modes.

As discussed above, and elsewhere herein as well, an embodiment of the invention may possess various useful features and advantages. These include, but are not limited to: [1] by activating a particular instance of the module Q at the appropriate layer, resources closer to the functional edge, which may be relatively limited as compared to resources available at higher layers, are not overwhelmed by storage nor processing demands-note that in an embodiment, it may be an aim to active the module Q instance in a layer furthest from the datastream, since even though latency may be somewhat greater, the resources available at that layer may be significantly more extensive than at lower layers closer to the datastream; [2] it is possible to spare processing and storage, if drift is detected in the earliest possible/feasible stages of the pipeline; [3] an embodiment may accelerate the drift detection process, and enables modularity of solutions by replacing the drift detection method without disrupting the solution; [4] an embodiment may enable the discovery of drift mode and frequency for a posterior, advanced analysis; and [5] an embodiment may provide control and orchestration of the module Q to perform drift detection mode buildings and their applications.

B.1 Module Positioning

Table 1 presents a summary of each module ID and the related policy for the module. Details of each module are presented below. Some policies may state that a module may be placed in the same layer as other or above. This may be due to storage constraints since there can be an application that disables a module to be installed in a certain layer. In more detail, the layer IDs, in Table 1 and the discussion below, increase in number from the functional edge layer 204 towards the cloud layer 212. In an embodiment, the modules Q 210 may not be placed below layer [c] 208 since that placement may necessitate data transfer back and forth in layers, causing unnecessary bandwidth consumption. This same consideration relating to data transfer may apply as well to placement of the control module C 201.

B.1.1 DataStream D and Operational Module M

As noted earlier herein, an embodiment of the invention may involve the use of a datastream, such as may be generated during normal operations in a domain, and may comprise an ML model that may receive the datastream as input, and then use the datastream to make various inferences about the conditions and operations within the domain. In an embodiment, the data in the datastream may generated in any layer, although one particular example embodiment is concerned with data generation in a functional edge layer. There are no restrictions on the nature of the ML model M 206—this model may be supervised or unsupervised, and either/both types may be employed in one or more embodiments of the invention. The scope of the invention is not limited to any particular ML model(s), or ML model deployment locations. In one embodiment, for example, a signal, that is, data, may be collected at a functional edge layer by a set of sensors, and the data may be input to the ML model which may then make predictions, or inferences, concerning the data.

As well, embodiments of the invention are not limited to any particular domain, application or ML model learning type, although there may, in one embodiment, be a benefit in relating the supervised training of an ML model with performance-based drift detection. In an embodiment, a user may rely on the label generation procedure to aid the drift detection by providing an "Oracle," that is, a module that provides ground-truth for observations/samples in the domain where the sensors and/or other data generators/collectors are located. On the other hand, if the ML model is unsupervised, the drift detection may be unsupervised as well, that is, the drift detection may be based on the distribution of the datastream data input to the ML model.

As an example of an edge environment in connection with which an embodiment of the invention may be employed, consideration may be given to the unsupervised case of sensors, as providing the datastream at a functional edge layer, with an ML model M deployed at forklifts, functioning as the far edge nodes in this example, to detect dangerous cornering events in a domain such as a logistics warehouse for example. More generally however, embodiments of the invention are not limited to any particular domain or edge environment.

B.1.2 Control Module C

In general, the control module C may perform two task, namely: (a) calculating the latency of the network considering the other modules and signal retrieval; and (b) analyzing the resource constraints of the layers. The latency and the resource constraints may, together, drive the decision to trigger the operation of a particular module Q instance—in an embodiment, only one module Q instance may be triggered, and run, during a given timeframe. These tasks are discussed in further detail below.

B.1.2.1 Setup

In an embodiment, a setup may be performed to properly position the control module C. An example method according to one embodiment is depicted in the algorithm below, and may operate to scan the edge network and choose the most suitable layer for placement of the control module C, which may also determine the number, and placement, of the instances of the module Q.

The algorithm is as follows. An embodiment may assume known distributions of the latencies between the layers of an architecture. These may be available by tracking the orchestration of the system, but, if not, may be obtained by any appropriate measuring process. An embodiment may determine an arbitrary percentile, such as the 95$^{th}$ percentile for example, to represent the practical worst-case latency $\sigma(i)$ for each pair of layers (li-1, li).

Recall that m is the layer at which the ML model M is deployed, and may be given, as it may be user/application-defined. The algorithm may compute the time-to-inference latency $\lambda M$ as the sum of worst-case latencies between the functional edge and m, plus the time t (M) to perform an inference in the ML model M, that is:

$$\lambda_M = t(M) + \sum_i^m \sigma(i)$$

A strictest latency requirement r for the 'drift detection' task may be given, as a maximum latency desirable, or permissible. The tentative latency to the drift detection $\lambda_p$ at each layer i>m is given by:

$$\lambda_{Di} = t(D) + \lambda M + \sum_j^i \sigma(i)$$

where t (D) represents the time for a drift detection process to determine that a drift is underway. Since multiple drift modes may be considered, an embodiment may adopt t (D) as the highest possible value for all drift modes. For example, recurring drift is likely to be the drift type that requires the most time to detect, that is, occurs most slowly as among the other drift types.

An embodiment of the invention may also define $\lambda_{Dm}$=t (D)+$\lambda_m$ only, since the formulation above would double count the latency between layers m−1 and m, if i were allowed to equal m, that is, i=m. The appropriate layer j for the module C may then be determined as:

$$j = \mathrm{argmin}_i(r - \lambda_{Di}); (r - \lambda_{Di}) \geq 0$$

The method above determines that the control module C, and instances of the module Q, are placed at the furthest possible layer from the ML model M that still satisfies the strictest latency requirements in a worst-case. The algorithm above is an example of a method for that determination. In some embodiments, this placement may be determined by a user specialist, or any other appropriate process that favors highest layers, while still respecting the latency requirements for the drift detection task.

B.1.2.2 Operation

Once started, the control module C may continuously send and receive signals across the layers of the network, pinging all layers above c. The control module C may also refer to information input by the user, such as the TDI of the other modules TDI, as well as its own TDI. In an embodiment, user input may be provided by way of a UI 216 (see FIG. 2).

A resultant latency LR, between the ML model and the instances of the model Q, is the summation of the following stages, where there is a respective LR for each instance of the model Q, and each instance of the model Q may detect a different respective drift mode, or modes:

latency for each layer k in-between layer m and layer q, obtained by pinging;

total TDI of Q, obtained from a precomputed table which may be populated by a subject matter expert—this information may be related to the operation of the module Q and used by the control module C to drive decisions, such as decisions concerning placement of the module Q instances—the subject matter expert may populate the table with the methods that will be used to detect drift, and the mode(s) of the drift; and TDI of the control module C, which may be defined a priori.

The total TDI may be the summation of the mode building TDI and drift detector TDI. The amount of storage needed may be related to the amount of data needed to detect each applicable drift mode.

The largest total latency to be used by the control module C may be employed as a conservative measure but it may also, in one embodiment, be a required simplification since it may not be possible to know in advance the drift mode to give the control module C an exact TDI for real-time usage. If an application does not require a certain drift mode to be detected, the user may not add it to the table. Another possibility is to use the average of the total TDI instead of using the largest total latency.

B.1.2.3 Drift Detection and Mode Building, Q

Figure 3:
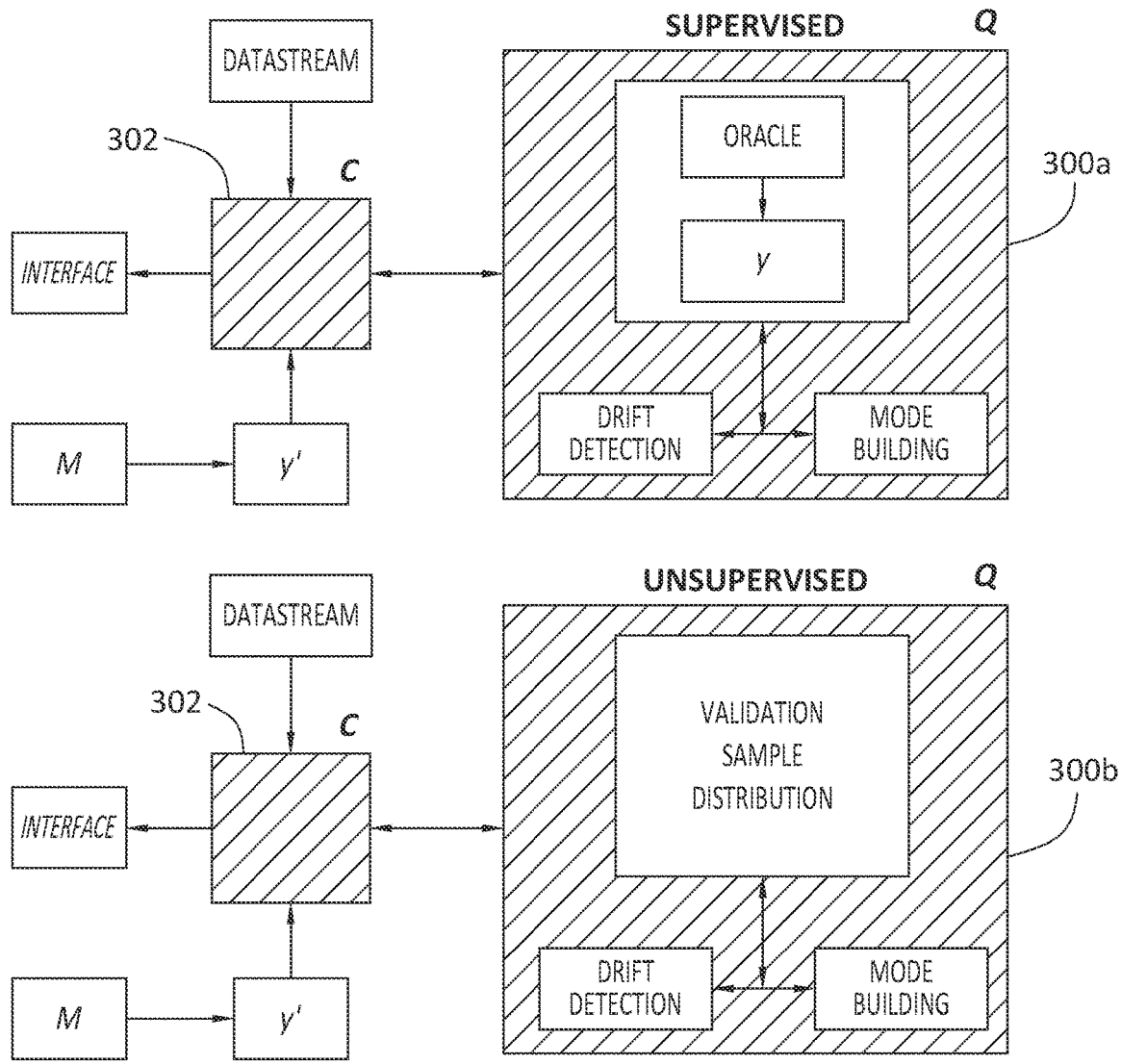
FIG. 3 discloses example alternative embodiments of drift model instances.

FIG. 3 presents module Q components 300a and 300b and control module C 302 as the sources of information. As shown, the module Q can operate in two ways, and this choice is may be bound to the operation of the ML model M.

In particular, the module Q 300a is implemented in a supervised manner, as may be done if an Oracle is provided. In this case, the function of the Oracle is to provide labels for the new data from the domain so ML model M outputs may be compared in performance terms with an appropriate metric, so as to determine whether drift is present, and the type of drift, if present. The Oracle may provide labels in different ways such as, but not limited to, semi-supervised learning, distant supervision, crowdsourcing, subject matter expert, or a combination of them as in PL (programmatic labeling). In embodiment, the module Q 300a may need performance-based methods to be embedded, as depicted in the top image of FIG. 3.

Alternatively, the module Q 300b is implemented as unsupervised if an Oracle is not provided. In this case, the new data from the domain may be compared to a validation sample distribution that resembles the original data. In an embodiment, the module Q 300b may need distribution-based methods to be embedded, as depicted in the bottom image of FIG. 3

Regardless of the methods adopted for drift detection and drift mode building, an embodiment of the invention may merge these two tasks because, in order to define the drift mode, the drift detection is typically required anyway. In one embodiment, a particular additional requirement is that certain drift modes require more data—and so a data threshold should be defined. Thus, in the definition of the Table described above, there may also be an indication of 'Storage' requirements related to the drift mode building task applied to each mode. Once a drift is detected, the drift detection and mode building tasks continue to keep track of the drift occurrences until the max 'Storage' value is reached while preliminary drift information is sent to the control module C.

B.2 Module Q Orchestration

In an embodiment, data, such as signals received by sensors, are acquired and used by the ML model M to make predictions. It may be assumed that operation is normal at this point, that is, no drift has occurred, or is occurring. The control module C may be activated intermittently, calculating the resultant latency and activating the proper instance of the module (which executes its routine until a drift is detected. Then, that instance of the module Q may send the drift detection results back to the control module C, which may also act as an interface to the user, providing the ongoing drift mode, the data that caused the drift to be detected, and the historical performance degradation in the operation of the ML model. In some circumstances, it may be expected that two or more drifts modes occur in sequence. For example, recurring drift is composed of many sudden drifts—but requires more storage to be detected.

The drift mode may further be used by the operator to reduce the solution complexity by leveraging only the detection related to that drift type. The historical performance degradation enables the correlation with the signals for compliance. In an embodiment, after drift detection has taken place, the ML model M may be updated such as by further training, or replaced.

In an embodiment, the input parameters may comprise: [1] a drift information package obtained from a precomputed table, an example of which is disclosed herein; [2] the operational module layer m, that is, identification of the layer where the ML model is, or will be, deployed; [3] the data stream layer d, that is, the layer where the datastream is generated; and, [4] the permissible latency t. When the various input parameters have been obtained, the first operation in a method according to one embodiment is to place the control module C and modules Q according to the algorithm discussed above. From this time on, the control module C may be executed as discussed previously.

Figure 4:
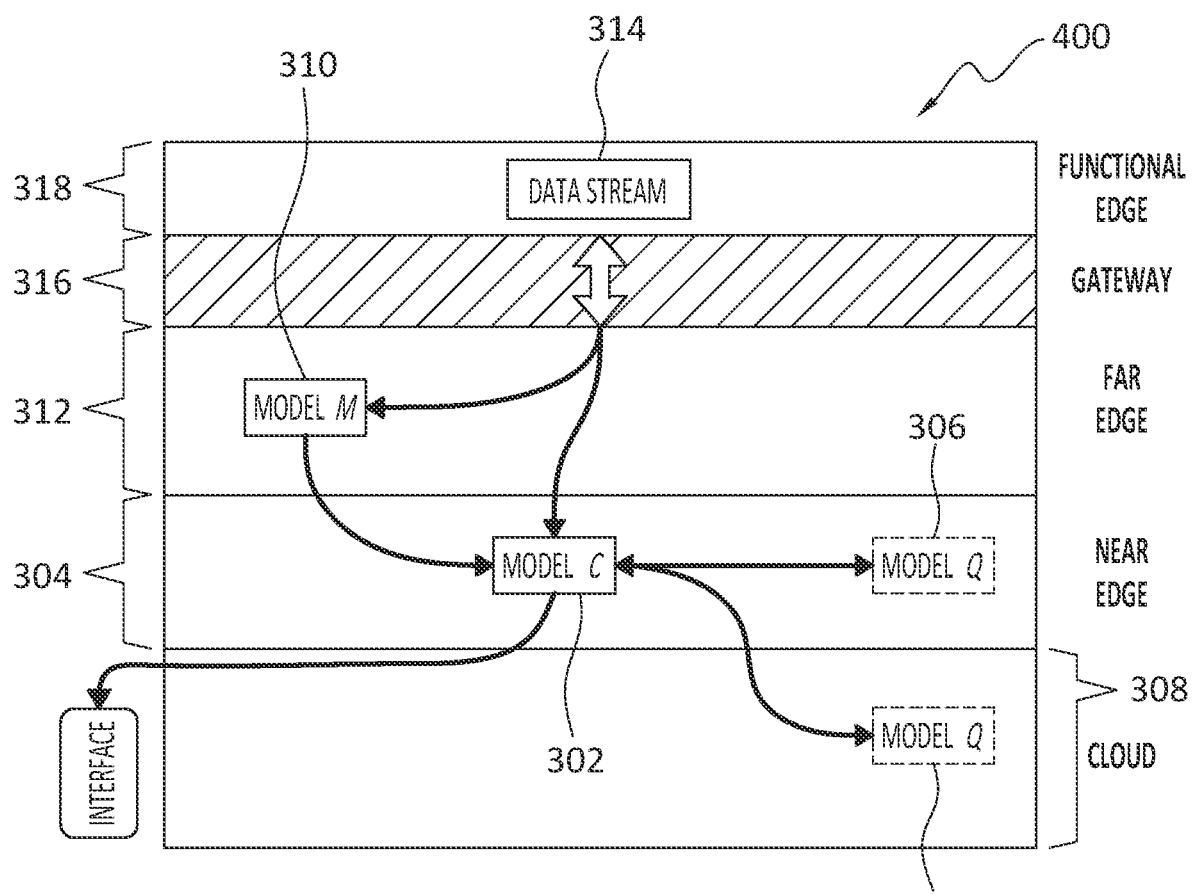
FIG. 4 discloses aspects of the placement of a control module, ML model, and drift model instances, according to another example embodiment of the invention.

With attention now to FIG. 4, an example architecture 400 and associated control module C 302 and modules Q placements are disclosed. In particular, in FIG. 4, the control module C 302 is placed in the near edge layer 304, and respective instances of the module Q 306 placed in the near edge layer 304 and a cloud layer 308. The ML model m 310 is placed in the far edge layer 312, and a datastream 314 generated in the functional edge layer 316 is passed to the ML model m 310 by way of a gateway 316. Note that the datastream 314 may be split, with a first portion provided to the ML model m 310, and as second portion, which may comprise raw data, provided directly to the control module C 302.

In an embodiment, for example, the architecture 400 may be implemented in, or as part of, a domain such as a logistics warehouse for example. The devices operating in the functional edge layer may comprise sensors deployed on equipment such as forklifts for example, and the ML model m 310 operable to detect dangerous cornering events performed by the forklifts.

As illustrated by the example of FIG. 4, and embodiment may determine the appropriate layers for the control and drift detection modules, regardless of the meaning or number of layers. The examples in FIG. 2 and FIG. 4 are illustrative only however, adopting the terminology and number of layers currently considered for typical edge environments. In general, an embodiment of the invention may be agnostic as to the meaning and number of layers in the environment, that is, such embodiment is applicable regardless of the layers considered as part of the 'edge environment' or other environment.

C. Example Methods

Figure 5:
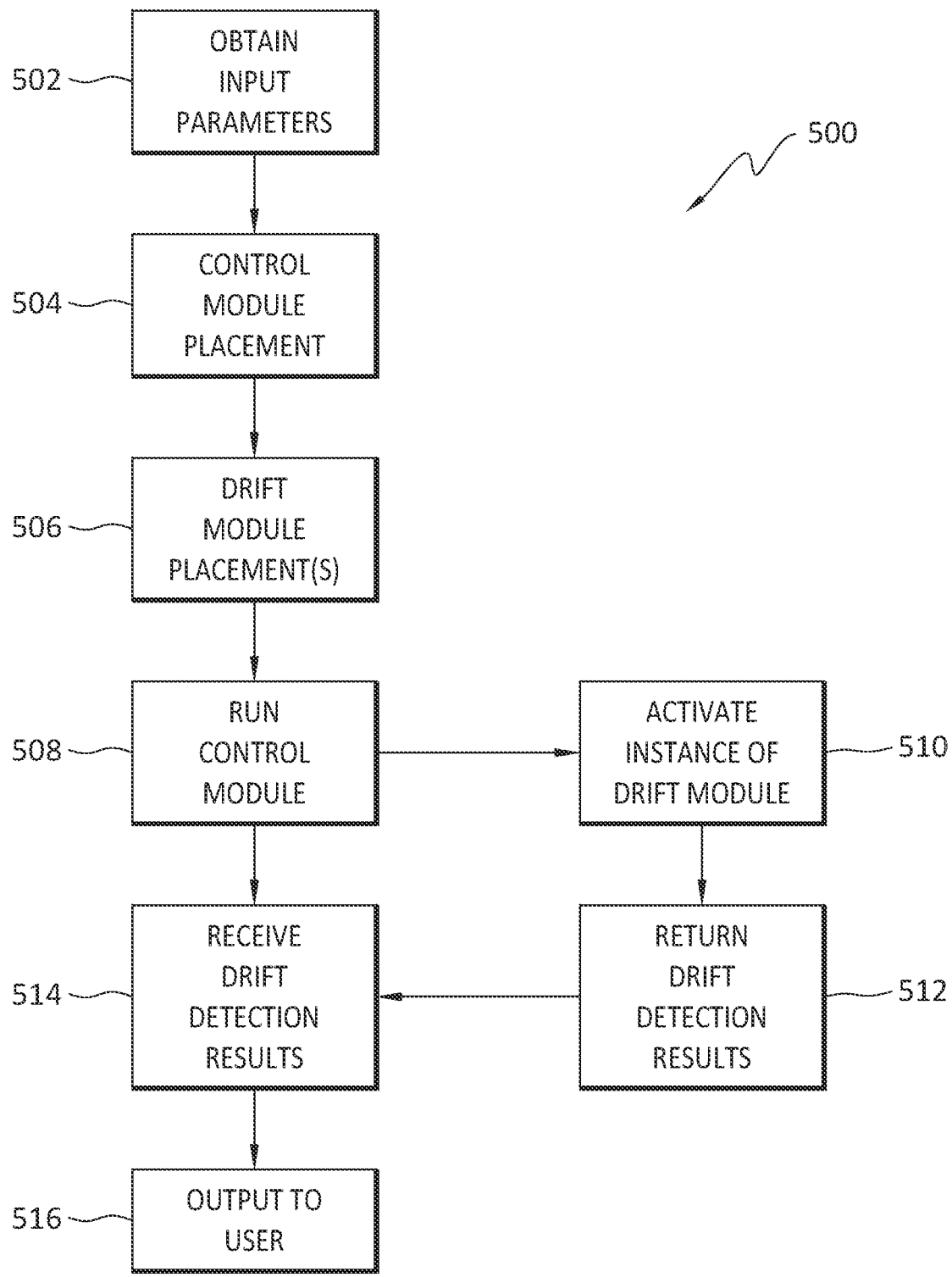
FIG. 5 discloses a method according to one example embodiment of the invention.

It is noted with respect to the disclosed methods, including the example method of FIG. 5, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 5, a method according to one example embodiment is referenced at 500. In an embodiment, part or all of the method 500 may be performed, such as in a multi-layer computing environment that includes a functional edge layer, cooperatively by a control module and one or more instances of a drift module. No particular environment or combination of modules is required however.

The example method 500 may begin when various input parameters are obtained 502, such as from a user, a table, and/or from a subject matter expert. Examples of such input parameters are disclosed elsewhere herein. One of the input parameters may comprise information identifying the layer of an architecture in which an ML model is deployed.

The input parameters may be used as a basis for placement 504 of a control module in a particular layer of the environment. The control module, in turn, may determine the number and placement 506 of one or more instances of a drift module.

When the control module and the drift module instances have been placed, the control module may then be run 508. As part of the running, or execution, of the control module, the control module may determine which of the drift module instances to activate 510 for detection of drift in the operation of the ML model.

The activated drift module may run until such time as drift is detected, and the type of drift identified. Then, these drift detection results may be returned 512 to the control module. The control module may then receive 514 the drift detection results, and output 516 those results to a user so as to enable, for example, update or replacement of the ML module.

D. Further Example Embodiments

Following are some further example embodiments of the invention. These are presented only by way of example and are not intended to limit the scope of the invention in any way.

Embodiment 1. A method, comprising: in a computing environment that includes multiple layers, one of which is a functional edge layer, performing operations comprising: obtaining input parameters, and one of the input parameters identifies one of the layers of the computing environment where a machine learning model is located; based on the input parameters, placing a control module in one of the layers of the computing environment; determining, by the control module, candidate layers of the computing environment for respective instances of a drift module, and placing a respective one of the instances of the drift module in each of the candidate layers; running the control module to identify an instance of the drift module to be activated, and activating the identified instance of the drift module; and detecting, by the activated instance of the drift module, drift in the machine learning model.

Embodiment 2. The method as recited in any preceding embodiment, wherein the drift is one of sudden drift, gradual drift, recurring drift, or incremental drift.

Embodiment 3. The method as recited in any preceding embodiment, wherein the drift module instances are placed as far as possible from a datastream generated in the functional edge layer, while maintaining fidelity to a worst case latency requirement.

Embodiment 4. The method as recited in any preceding embodiment, wherein drift detection performed by one of the instances of the drift module comprises a combination of performance-based drift detection, and distribution-based drift detection.

Embodiment 5. The method as recited in any preceding embodiment, wherein the machine learning model operates on a datastream generated in the functional edge layer.

Embodiment 6. The method as recited in any preceding embodiment, wherein only one of the drift module instances is active at any one time.

Embodiment 7. The method as recited in any preceding embodiment, wherein placement of the drift module instances is based on latency in the computing environment, communication bandwidth in the computing environment, and data storage resources in the computing environment.

Embodiment 8. The method as recited in any preceding embodiment, wherein drift detection is performed by one of the instances of the drift module based in part on data intensity, and based on time to data insight.

Embodiment 9. The method as recited in any preceding embodiment, wherein the activated instance of the drift module is selected for activation based on latency in the computing environment, and based on storage demands associated with drift detection.

Embodiment 10. The method as recited in any preceding embodiment, wherein the control module determines latency within the computing environment, and the latency forms part of a basis for identification of the instance of the drift module to be activated.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
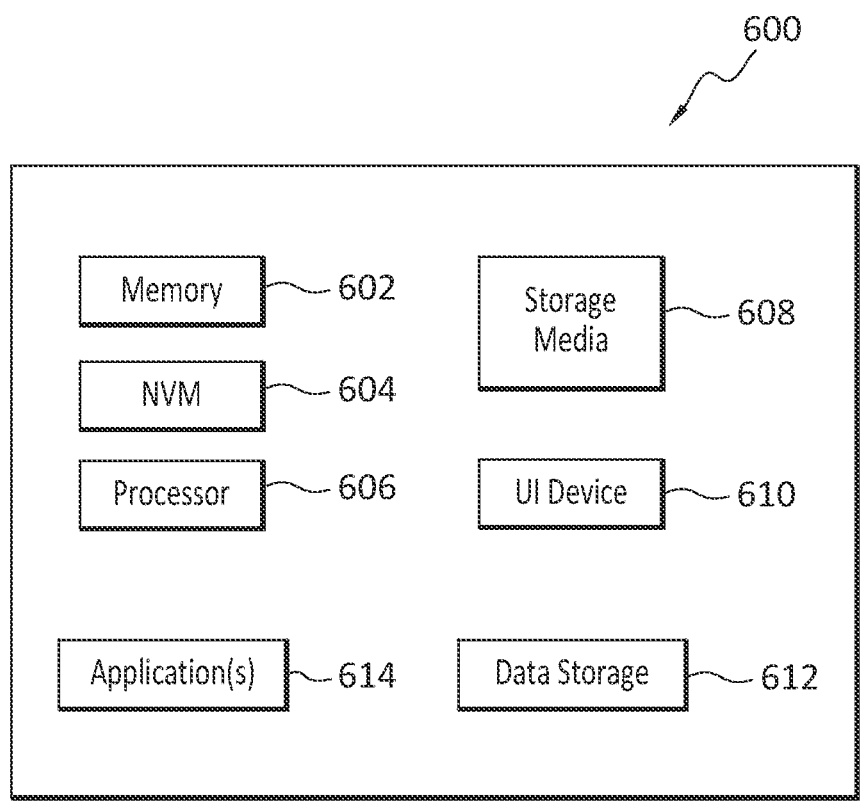
FIG. 6 discloses an example computing entity configured and operable to perform any of the disclosed methods, processes, and operations.

With reference briefly now to FIG. 6, any one or more of the entities disclosed, or implied, by FIGS. 1-5, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606' to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   in a computing environment that includes multiple layers, one of which is a functional edge layer, performing operations comprising:
   obtaining input parameters, and one of the input parameters identifies one of the layers of the computing environment where a machine learning model is located;
   based on the input parameters, placing a control module in one of the layers of the computing environment;
   determining, by the control module, candidate layers of the computing environment for respective instances of a drift module, and placing a respective one of the instances of the drift module in each of the candidate layers;
   running the control module to identify an instance of the drift module to be activated, and activating the identified instance of the drift module; and
   detecting, by the activated instance of the drift module, drift in the machine learning model.

2. The method as recited in claim 1, wherein the drift is one of sudden drift, gradual drift, recurring drift, or incremental drift.

3. The method as recited in claim 1, wherein the drift module instances are placed as far as possible from a datastream generated in the functional edge layer, while maintaining fidelity to a worst case latency requirement.

4. The method as recited in claim 1, wherein drift detection performed by one of the instances of the drift module comprises a combination of performance-based drift detection, and distribution-based drift detection.

5. The method as recited in claim 1, wherein the machine learning model operates on a datastream generated in the functional edge layer.

6. The method as recited in claim 1, wherein only one of the drift module instances is active at any one time.

7. The method as recited in claim 1, wherein placement of the drift module instances is based on latency in the computing environment, communication bandwidth in the computing environment, and data storage resources in the computing environment.

8. The method as recited in claim 1, wherein drift detection is performed by one of the instances of the drift module based in part on data intensity, and based on time to data insight.

9. The method as recited in claim 1, wherein the activated instance of the drift module is selected for activation based on latency in the computing environment, and based on storage demands associated with drift detection.

10. The method as recited in claim 1, wherein the control module determines latency within the computing environment, and the latency forms part of a basis for identification of the instance of the drift module to be activated.

11. A non-transitory storage medium having stored therein instructions that are executable by one or more hardware processors to perform:
 in a computing environment that includes multiple layers, one of which is a functional edge layer, operations comprising:
  obtaining input parameters, and one of the input parameters identifies one of the layers of the computing environment where a machine learning model is located;
  based on the input parameters, placing a control module in one of the layers of the computing environment;
  determining, by the control module, candidate layers of the computing environment for respective instances of a drift module, and placing a respective one of the instances of the drift module in each of the candidate layers;
  running the control module to identify an instance of the drift module to be activated, and activating the identified instance of the drift module; and
  detecting, by the activated instance of the drift module, drift in the machine learning model.

12. The non-transitory storage medium as recited in claim 11, wherein the drift is one of sudden drift, gradual drift, recurring drift, or incremental drift.

13. The non-transitory storage medium as recited in claim 11, wherein the drift module instances are placed as far as possible from a datastream generated in the functional edge layer, while maintaining fidelity to a worst case latency requirement.

14. The non-transitory storage medium as recited in claim 11, wherein drift detection performed by one of the instances of the drift module comprises a combination of performance-based drift detection, and distribution-based drift detection.

15. The non-transitory storage medium as recited in claim 11, wherein the machine learning model operates on a datastream generated in the functional edge layer.

16. The non-transitory storage medium as recited in claim 11, wherein only one of the drift module instances is active at any one time.

17. The non-transitory storage medium as recited in claim 11, wherein placement of the drift module instances is based on latency in the computing environment, communication bandwidth in the computing environment, and data storage resources in the computing environment.

18. The non-transitory storage medium as recited in claim 11, wherein drift detection is performed by one of the instances of the drift module based in part on data intensity, and based on time to data insight.

19. The non-transitory storage medium as recited in claim 11, wherein the activated instance of the drift module is selected for activation based on latency in the computing environment, and based on storage demands associated with drift detection.

20. The non-transitory storage medium as recited in claim 11, wherein the control module determines latency within the computing environment, and the latency forms part of a basis for identification of the instance of the drift module to be activated.

* * * * *

UNITED STATES PATENT AND TRADEMARK OFFICE
CERTIFICATE OF CORRECTION

PATENT NO. : 12,379,996 B2
APPLICATION NO. : 18/475132
DATED : August 5, 2025
INVENTOR(S) : Herberth Birck Fröhlich et al.

It is certified that error appears in the above-identified patent and that said Letters Patent is hereby corrected as shown below:

In the Specification

<u>Column 10</u>
Line 33, change "functional edge layer 316" to – functional edge layer 318 –

Signed and Sealed this
Twenty-third Day of December, 2025

John A. Squires
*Director of the United States Patent and Trademark Office*